United States Patent

Rahman et al.

Patent Number: 6,101,379
Date of Patent: Aug. 8, 2000

[54] MOBILE TERMINAL BASED TARIFF ACQUISITION SYSTEM FOR WIRELESS SERVICES

[75] Inventors: Tariq Rahman, Spånga; Laurence McDonald, Uppsala, both of Sweden

[73] Assignee: Telefonaktiebolaget LM Ericsson, Stockholm, Sweden

[21] Appl. No.: 08/921,030

[22] Filed: Aug. 29, 1997

[51] Int. Cl.[7] ....................................... H04Q 7/32
[52] U.S. Cl. ...................... 455/406; 455/407; 455/408
[58] Field of Search ...................... 455/405, 406, 455/407, 408, 414, 432, 435, 445, 433, 444; 379/114, 115, 121, 144, 59

[56] References Cited

U.S. PATENT DOCUMENTS

| | | | |
|---|---|---|---|
| 4,726,056 | 2/1988 | An et al. | 379/114 |
| 5,134,651 | 7/1992 | Ortiz et al. | 379/112 |
| 5,303,297 | 4/1994 | Hillis | 379/114 |
| 5,764,741 | 6/1998 | Barak | 379/114 |
| 5,802,468 | 9/1998 | Gallant et al. | 455/422 |
| 5,848,138 | 12/1998 | Sarpola et al. | 455/407 |
| 5,862,203 | 1/1999 | Wulkan et al. | 379/112 |
| 5,862,471 | 1/1999 | Tiedemann, Jr. et al. | 455/406 |
| 5,915,214 | 6/1999 | Reece et al. | 455/406 |
| 5,983,092 | 11/1999 | Whinnett et al. | 455/406 |

FOREIGN PATENT DOCUMENTS

| | | |
|---|---|---|
| 808 073 | 11/1997 | European Pat. Off. . |
| WO94/28683 | 12/1994 | WIPO . |
| WO96/24226 | 8/1996 | WIPO . |
| WO96/28947 | 9/1996 | WIPO . |

OTHER PUBLICATIONS

European Standard Search Report re RS 100098 Date of completion of search: May 28, 1998.

Primary Examiner—William G. Trost
Assistant Examiner—Jean A Gelin
Attorney, Agent, or Firm—Burns, Doane, Swecker & Mathis, L.L.P.

[57] ABSTRACT

A method of acquiring potential tariff charges assessed by wireless service providers to a mobile subscriber prior to registration is disclosed herein. The method includes transmitting a request for tariff information by the mobile terminal over a control channel to a candidate service provider. The candidate service provider determines an applicable tariff charge based on various factors such as roaming status, compulsory fees etc. The ensuing tariff charge is then transmitted back to the mobile terminal via the control channel. Subsequent tariff inquiries are made to other potential candidate service providers accessible by the mobile terminal. Once tariff information from all candidate service providers has been received, the mobile terminal may initiate registration e.g. with the cheapest service provider. The tariff information is able to be obtained prior to registering with a service provider, thus costs associated with registration are eliminated.

14 Claims, 2 Drawing Sheets

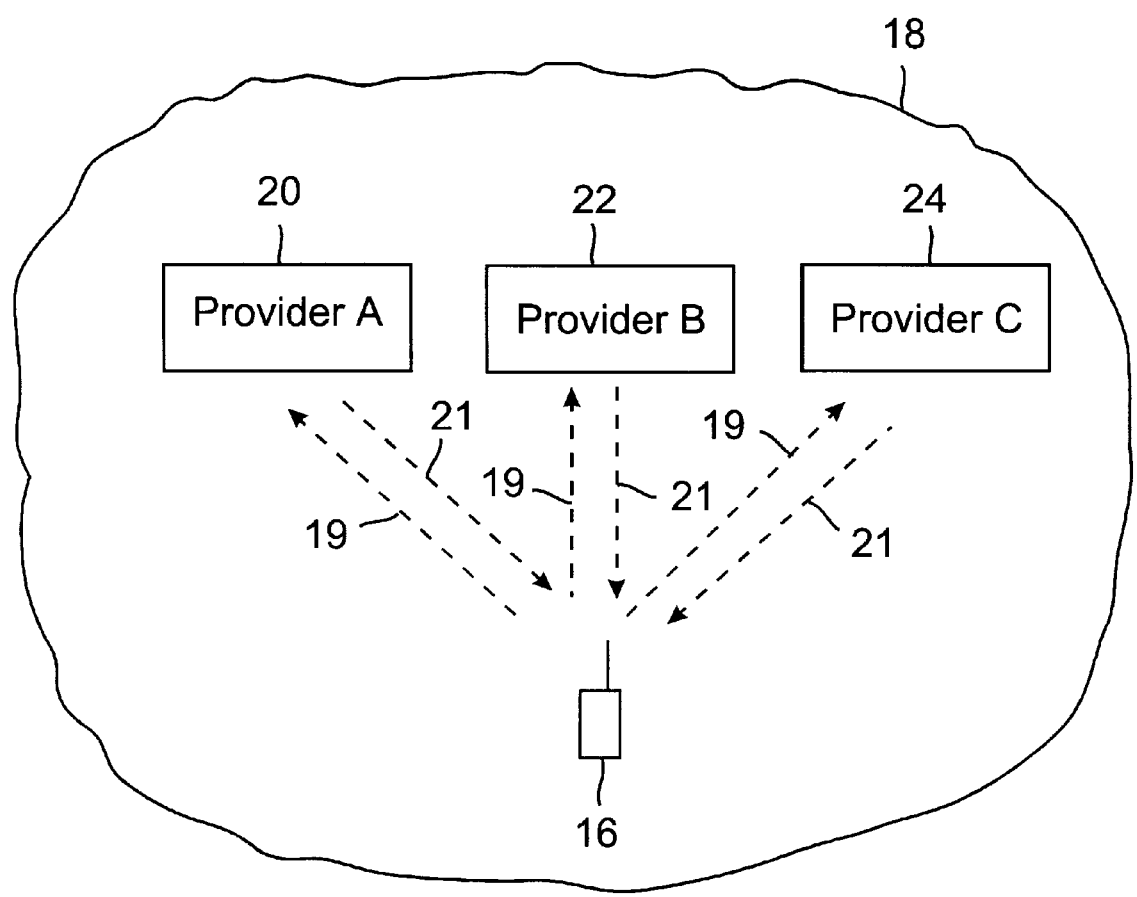

MOBILE TERMINAL BASED TARIFF ACQUISITION SYSTEM FOR WIRELESS SERVICES

FIELD OF THE INVENTION

The present invention relates generally to tariffs charged by wireless service providers, and pertains more specifically to a method of acquiring potential tariff information prior to mobile terminal registration.

BACKGROUND OF THE INVENTION

The tremendous growth in demand for wireless services has fostered an environment where multiple service providers may coexist to provide similar coverage and services in a given geographical area. This is particularly the trend in the United States where as many as two, three or more wireless operators may compete in a given metropolitan trading area (MTA). In this type of competitive environment, mobile subscribers are likely to seek out the lowest cost operator among competing service providers. A comparable situation currently exists among long distance carriers in the United States where customers, while receiving essentially the same level of service, can compare prices for a typical long distance call as a factor in choosing one carrier over another. Similarly, wireless operators will have an incentive to compete for mobile subscribers and to advertise their price and services in an effort to attract customers.

There have been a number of proposals put forth in the past that specify systems to permit subscribers to obtain tariff information charged by various service providers. FIG. 1 illustrates a prior art technique in which tariff information can be obtained by an individual subscriber for the purpose of choosing the cheapest service provider. For example, a mobile terminal 10 is located in an area where it has potential access to three service providers, each of which providing substantially similar service and coverage. The three providers may be operating in accordance with the same standard, thus only requiring a single standard phone, or they may be operating in accordance with different wireless standards. A multi-standard mobile terminal is required to access these systems operating on different standards.

In order to access tariff information, mobile terminal 10 proceeds to register to gain access with a service provider that is within his capability, such as provider A for example. Once access has been established, mobile terminal 10 sends a request to provider A for tariff information. Moreover, the request inquires about tariff information on competitors such as providers B and C. Upon receiving the request, provider A relays the request via the public switched telephone network (PSTN) 12 to an attached centralized server 14. The network providers are in communication with server 14 via the PTSN such that server 14 is able to maintain current tariff information on all participating systems through frequent updates. The requested tariff information is then relayed back through provider A to mobile terminal 10 for analysis. The mobile then has the option of establishing a connection with any of the other service providers B or C based on price, priority or some other predetermined parameter.

One major disadvantage with the aforementioned approach is that implementation is complex and requires substantial changes in current network systems for implementation. By way of example, significant changes in software and control messages must be incorporated to accommodate the central tariff server thereby making backward compatibility with existing networks difficult. Furthermore, the approach requires the subscriber to undergo a registration process in order to gain access to a service provider thereby accruing the costs associated with registration for tariff investigation. Additionally the approach potentially requires the subscriber to terminate his current service and re-register with a another provider if it is determined that this is preferable. Other considerations may include cost and reliability. For example, server 14 may be maintained by a third party thereby increasing the cost. Furthermore, the tariff information stored on the server is only indirectly accessed by the mobile terminal 10, thus the usefulness to the subscriber depends wholly on timely updates and server reliability.

In view of the foregoing, it is an objective of the present invention to provide a method for permitting access to tariff information without requiring the subscriber to first register with a service provider. A further objective is to provide a cost efficient, relatively less complex system that is more backward compatible with existing systems and standards.

SUMMARY OF THE INVENTION

Briefly described, and in accordance with an embodiment thereof, the invention discloses a method of acquiring potential tariff charges assessed by wireless service providers to mobile subscribers prior to registration. The method includes transmitting a request for tariff information together with subscriber identification information over a control channel from a mobile terminal to a candidate service provider. An acknowledgment message may be sent by the service provider to the mobile terminal to indicate that the tariff request was received. The candidate service provider then determines an applicable tariff charge based on categorical factors such as roaming status, type of service requested etc. The ensuing tariff charge is transmitted back to the mobile terminal via the control channel. Similar tariff inquiries are made in sequence to other potential candidate service providers that are accessible by the mobile terminal in that geographical area. Once tariff information from all candidate service providers has been received, the mobile terminal may initiate registration with the lowest cost service provider, in accordance with the prevailing operating standard.

The present invention discloses a method of acquiring tariff information that may be potentially assessed to the subscriber. The tariff information is obtained prior to the mobile terminal registering with a provider thereby eliminating the costs associated with registration for tariff requests. Furthermore, the inventive concept may be implemented with relatively minor modifications to existing wireless systems thereby significantly increasing backward compatibility. These and other advantages of the present invention will become apparent upon reading the following detailed descriptions and studying the various figures of the drawings.

BRIEF DESCRIPTION OF THE DRAWINGS

The invention, together with further objectives and advantages thereof, may best be understood by reference to the following description taken in conjunction with the accompanying drawings in which:

FIG. 2 illustrates a mobile terminal based tariff acquisition system operating in accordance with an embodiment of the present invention.

DETAILED DESCRIPTION OF THE PREFERRED EMBODIMENTS

Figure 1:
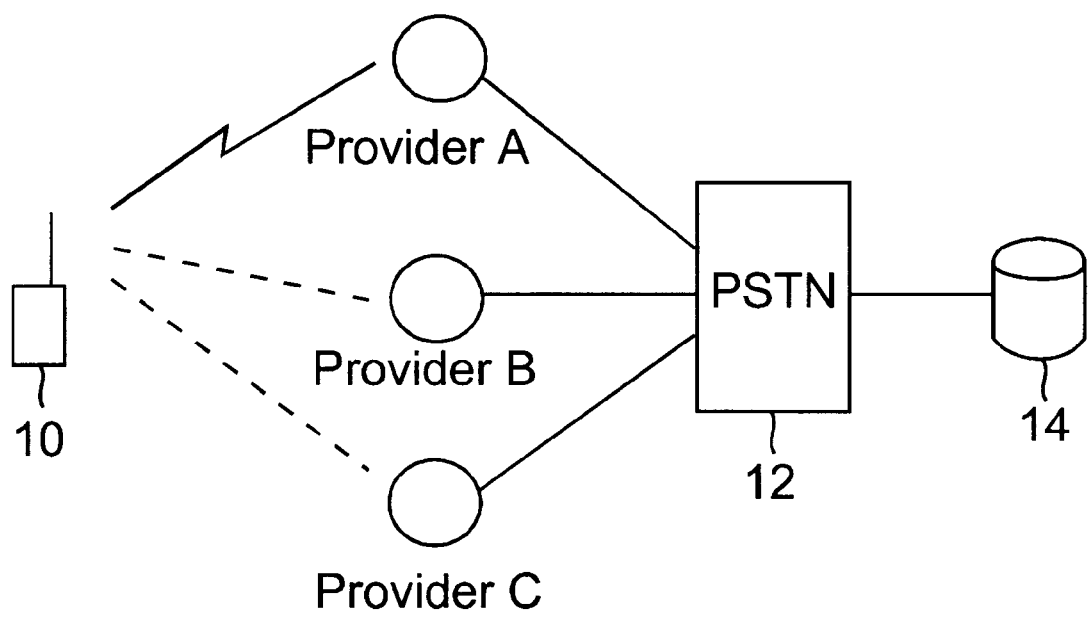
FIG. 1 illustrates a prior art technique for acquiring tariff information from a centralized server.

In a basic cellular telecommunication system, a mobile switching center (MSC) is linked to a plurality of base stations by a series of digital transmission links. The base stations are geographically dispersed to form an area of coverage for the system. Each base station (BS) is designated to cover a specified area, known as a cell, in which two way radio communication can take place between a mobile terminal and the BS in the associated cell. A description of a mobile terminal based tariff acquisition system operating in accordance with the present invention follows.

FIG. 2 depicts an exemplary tariff acquisition system operating in accordance with an embodiment of the present invention. For simplicity, associated base stations are not shown. Mobile terminal (MT) 16 may be operating in a given geographical area 18 which may be a visiting area by which the subscriber roams into or the subscriber's home service area. Geographical area 18 may contain multiple service providers, each providing substantially similar service and area of coverage, in which the individual providers may operate in accordance with a variety of wireless standards. In the preferred embodiment, MT 16 is capable of multi-standard and multi-band operation for increased likelihood for accessing candidate networks.

In telecommunication systems operating in accordance with Digital Advanced Mobile Phone System (D-AMPS), for example, calls initiated from an MT undergo a procedure referred to as "registration" in order to access service. Registration is a process by which the MSC uses to keep track of MTs active in its service area. In the case of a roaming MT switched on in a visiting service area, the visited MSC determines the identity of the subscriber from information transmitted during the tariff request. Such subscriber identification may be determined from a mobile identification number (MIN) transmitted over a radio control channel. The control channel provides the necessary communication and signaling between the MT and the MSC when the MT is not in conversation such as during paging and access procedures. The MSC then determines if the requesting terminal is a visiting MT and can therefore initiate the appropriate registration procedure.

In an exemplary implementation of the present invention, prior to initiating procedures for registration, MT 16 initiates a tariff inquiry request to all candidate service providers on all bands and standards it can support. This is accomplished through the control channel designated by each operator. The inquiry can be initiated by the subscriber by dialing a code or simply pushing an associated key on the mobile terminal, for example. A new control message 19 containing a "Tariff Request" indicator is sent by MT 16 to each of the candidate providers A, B, and C, respectively designated by reference numerals 20, 22, and 24 on their respective control channels. The MSC of the candidate operator determines that this is a preregistration tariff inquiry and can send back an optional "Tariff Request Acknowledge" message to notify the mobile terminal that the request was accepted. The MSC then calculates the potential tariff charges for the subscriber. If the subscriber happens to be roaming at the time of the inquiry request, the candidate MSC can determine this from the mobile identification number (MIN) which is transmitted over the control channel. The MSC can determine that the MT is not a home subscriber typically by comparing the MIN to those stored in predefined database. Those skilled in the art will appreciate that various procedures or protocols for subscriber identification may occur in systems operating in accordance with different standards. Therefore the invention may be adapted to work within the procedures of the prevailing standard to uniquely identify a subscriber e.g. the international mobile subscriber identity (IMSI) used in Global System for Mobile Communication (GSM) systems.

Once the status of the subscriber has been determined, the appropriate charges can be calculated. Tariff charges may be segmented and applied to an subscriber depending on any number of criteria, such as whether the subscriber is an national/international roamer or if any additional compulsory fees should be applied in accordance with negotiated agreements, for example. Furthermore, tariffs may be subject to change in response to dynamic factors such as increased traffic load at any given moment, for example. Such flexibility in tariff calculations allows operators considerable versatility in devising pricing and marketing plans for generating revenue.

Following the calculation of tariff charges, the candidate operator responds with the appropriate tariff information sent through a new message "Tariff Information" via the control channel to MT 16. Since tariff charges may vary among individual providers, tariff inquiries are made to the other candidate providers in sequence in a similar fashion. The tariff data is stored in a memory in MT 16 in which the data can be displayed on the mobile terminal to the user. Registration procedures can be initiated automatically with the lowest cost provider or some other prioritized factor set by the user. Additionally provider selection may be performed manually by user input on the MT.

The present invention contemplates a method for mobile terminals to acquire tariff information without having to first register with a provider. The method is especially suited for roaming subscribers where knowledge of tariff information may be limited. As described, such a system is suitable for use with various existing wireless systems and standards with relatively minor modifications to existing signaling control messages thus significantly increasing backward compatibility.

While the invention has been described with reference to a specific embodiment, the description is illustrative of the invention and is not to be construed as limiting to the invention. In particular, the concept may be implemented for used with various wireless systems operating in accordance with, for example, Code Division Multiple Access (CDMA), Global System for Mobile Communication (GSM), or Personal Digital Cellular (PDC) in addition to analog systems operating in accordance with Advanced Mobile Phone System (AMPS), Total Access Communication System (TACS), Nordic Mobile Telecommunication (NMT), and satellite based terrestrial systems. Furthermore, terminals for use with the present invention that are capable of multi-band and/or multi-standard operation will have access to a greater number of service providers than single-band or single-standard terminals. Therefore, various modifications and applications may occur to those skilled in the art without departing from the true spirit and scope of the invention as defined by the appended claims.

What is claimed is:

1. A method of acquiring tariff charges assessed by a plurality of wireless services providers by a mobile terminal prior to registration, said method comprising the steps of:

transmitting a request for tariff information by said mobile terminal to said plurality of service providers, said request including subscriber identification information;

determining a tariff charge applicable to said mobile terminal based on a status of a subscriber identified by said subscriber identification information by each of said plurality of service providers;

transmitting said applicable tariff charge for each of said plurality of service providers to said mobile terminal; and selectively registering said mobile terminal with one of said plurality of service providers based on said applicable tariff charge.

2. A method according to claim 1 wherein said transmitting request step includes sending said tariff request message over a control channel.

3. A method according to claim 1 wherein said subscriber identification information is the mobile identification number (MIN) of the mobile terminal.

4. A method according to claim 1 wherein said determining step includes ascertaining the existence of a roaming agreement with the home service provider of the mobile terminal.

5. A method according to claim 1 wherein said second transmitting step includes sending said applicable tariff charge over a control channel to the mobile terminal.

6. A method of obtaining wireless telecommunication service with a service provider from at least two candidate service providers that are accessible by a mobile terminal, said method comprising the steps of:

transmitting a request for tariff information from a mobile terminal to a first service provider, said request including subscriber identification information;

determining a first tariff charge for said mobile terminal by said first service provider based on a status of a subscriber associated with said subscriber identification information;

transmitting said first tariff charge from said first service provider to said mobile terminal;

transmitting a request for tariff information from said mobile terminal to a second service provider, said request including subscriber identification information;

determining a second tariff charge for said mobile terminal by said second service provider based on a status of a subscriber associated with said subscriber identification information;

transmitting said second tariff charge from said second service provider to said mobile terminal;

evaluating said first tariff charge and said second tariff charge;

selecting one of said service providers based on said transmitted tariff charges; and registering with said selected service provider.

7. A method according to claim 6 wherein said transmitting steps occurs over an appropriate control channel.

8. A method according to claim 6 wherein said determining step includes ascertaining the terms of a roaming agreement with the home service provider of said mobile terminal.

9. A method according to claim 6 wherein said selecting step includes selecting the service provider associated with the lowest tariff charge.

10. A method according to claim 6 wherein said registering step is automatically performed by said mobile terminal.

11. A method according to claim 6 wherein said registering step is manually performed by the subscriber after said charges are displayed on said mobile terminal.

12. A method according to claim 6 wherein said registering step proceeds in accordance with registration procedures defined in the current operating standard.

13. A tariff acquisition system for receiving tariff information by a mobile terminal from at least one wireless service provider comprising;

a mobile terminal which transmits a request for tariff information including subscriber identification information to said service provider;

a tariff calculation function for determining a tariff charge for said mobile terminal based on a status of a subscriber associated with said subscriber identification information; and a control channel for conveying said tariff information request from said mobile terminal to said service provider and wherein said tariff charge is conveyed from said service provider to said mobile terminal, wherein following receipt of said tariff charge, said mobile terminal initiates a registration procedure with a preferred service provider.

14. A tariff acquisition system according to claim 13 wherein said tariff charge is displayed on said mobile terminal.

* * * * *